United States Patent [19]

Vickery

[11] 3,714,334

[45] Jan. 30, 1973

[54] PROCESS FOR EPITAXIAL GROWTH OF DIAMONDS

[75] Inventor: Earl C. Vickery, Phoenix, Ariz.

[73] Assignee: Diamond Squared Industries Inc., Scottsdale, Ariz.

[22] Filed: May 3, 1971

[21] Appl. No.: 139,813

[52] U.S. Cl. ................................................423/446
[51] Int. Cl. .............................................C01b 31/06
[58] Field of Search ...23/209.1, 209.5, 301; 423/446

[56] References Cited

UNITED STATES PATENTS

| | | | |
|---|---|---|---|
| 3,371,996 | 5/1968 | Hibshman | 23/209.1 |
| 3,030,187 | 4/1962 | Eversole | 23/209.1 X |
| 3,030,188 | 4/1962 | Eversole | 23/209.1 X |
| 3,175,885 | 3/1965 | Brinkman et al. | 23/209.1 |

OTHER PUBLICATIONS

Angus et al., "Journal of Applied Physics" Vol. 39, No. 6, May 1968, pages 2915-2922.

Primary Examiner—Edward J. Meros
Attorney—Dominik, Knechtel & Godula

[57] ABSTRACT

A method for growing diamonds in the form of diamond dust, industrial grade diamonds and the like, by epitaxy comprising the steps of providing a diamond seed crystal, contacting said diamond seed crystal with a hydrocarbon having from one to about five carbon atoms in an environment consisting of at least 95 percent hydrogen gas by volume and about no more than 5 percent of the said hydrocarbon by volume, maintaining the temperature of the reaction environment in the range of from about 1,100° C. to about 1,700° C., and reacting the said diamond seed crystal with the said hydrocarbon and the hydrogen gas in the presence of a catalyst being a member selected from the group consisting of platinum and paladium, thereby causing said hydrocarbon to form diamond carbon and deposit it on the surface of said diamond seed crystal while simultaneously causing less stable forms of carbon also formed from said hydrocarbon to react with the hydrogen gas in the presence of the catalyst and the temperature conditions to form additional quantities of hydrocarbon, said process continuing until the desired diamond growth has been achieved.

6 Claims, No Drawings

PROCESS FOR EPITAXIAL GROWTH OF DIAMONDS

BACKGROUND OF THE INVENTION

This invention is directed to a novel process for growing synthetic diamonds, including diamond dust, powders, or industrial grade diamonds, from diamond seed crystals in the presence of certain hydrocarbons and under certain reaction conditions which permit a continuous and usually rapid growth rate to occur pursuant to this process. More particularly, this invention is directed to a process wherein the diamond synthesis is permitted to occur on the substrate or surface of the diamond seed crystal by employing a hydrocarbon having from about one to about five carbon atoms, in a hydrogen gas environment and under conditions of excessive heat, i.e. from about 1,100° C. to about 1,700° C. under atmospheric pressure conditions, and finally, in the presence of a catalyst which catalyzes the reaction between the amorphous or elemental carbon, formed as a result of the breakdown of the hydrocarbons, and hydrogen gas in order to form additional amounts of hydrocarbon material thereby avoiding the deposition of amorphous or elemental carbon on the surface of the diamond seed crystal.

Diamonds produced by this process are of much purer quality than diamonds produced by other processes heretofore known in the art since the deposition of elemental or amorphous carbon is avoided. Furthermore, the net rate of growth of the diamond seed crystal when synthesized in accordance with this process is much greater than heretofore established by the known processes, and therefore from a commercial standpoint, the process is far more desirable and advantageous over any process heretofore known in the art.

Several processes for the synthesis of diamonds from seed crystals have been devised and are known in the art for making diamond powder or industrial grade as well as synthetic diamond grade stones. For example, U.S. Pat. No. 3,030,187 discloses a method for growing diamonds by using a diamond seed crystal which employs either one or two series of reactions as follows:

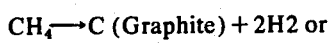

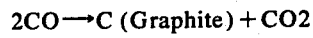

The reactions designated I above, are conducted at sub-atmospheric pressure and at temperatures of between 900° and 1,100°C. The reactions designated II above are conducted at about 10 atmospheres of pressure and at temperatures of between 900° and 1,100°C. However, the principal drawback of either of these two reactions in terms of a commercial process for growing synthetic diamonds from diamond seed crystals is the fact that graphite carbon is being formed simultaneously with the diamond carbon, and such graphite or amorphous carbon is simultaneously being deposited on the surface of the diamond seed crystal. Hence, it is necessary that the reaction be stopped periodically and that the diamond seed crystals be continually cleaned in order to remove the graphite or amorphous carbon before the reaction can be continued to deposit additional amounts of single crystal carbon thereon. The patent itself teaches that four times more cleaning time than deposition time is required and hence, the reaction is very uneconomical from a commercial standpoint.

A slightly varied approach is taught by U.S. Pat. No. 3,371,996 wherein there is shown a method for growing synehetic diamonds pursuant to the reaction:

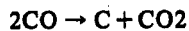

The reaction conditions under which the above reaction is operated include pressure at one atmosphere and a temperature of no greater than 1,200° C. In addition, the reaction is conducted in the presence of a metal selected from the group consisting of platinum, iridium, osmium, rhenium, gold, paladium, ruthenium, rhodium, silver and nickel, or two or more of the aforementioned metals combined. In this environment, it is taught that the presence of the aforementioned metal is essentially that of a catalyst in that it operates to accelerate the liberation of carbon from carbon monoxide. Unfortunately, it has been found that this reaction also results in the formation of graphite or amorphous carbon which becomes deposited on the surface of the diamond seed crystal and hence, interferes with the efficient operation of the process in terms of forming a pure and clear diamond and hence, repeated cleaning of the seed crystal is, once again, necessary.

Other prior art patents which relate to the liberation of carbon and/or the synthesis of diamonds from a diamond seed crystal include U.S. Pat. Nos. 3,079,237 and 3,030,188. However, neither of these prior art patents, nor those discussed hereinabove, teach or suggest a process for the manufacture of synthetic diamonds from diamond seed crystals, which process is operated at elevated temperatures and wherein the growth rate is greatly improved over other processes of the prior art. Furthermore, none of these references teach or suggest a process for manufacturing diamond particles from diamond seed crystals, which process totally eliminates or avoids the problem of the deposition of amorphous or elemental carbon on the surface of the diamond seed crystal during the growth process, thereby avoiding the problem of continually stopping the growth process in order to clean the seed crystal and remove the amorphous or elemental carbon deposited thereon. In addition, the process of the present invention eliminates the need for a catalyst to facilitate the breakdown of the hydrocarbon to form single crystal carbon, but rather, employs a catalyst only for the purpose of catalyzing the reaction between hydrogen and the graphite or elemental carbon formed during the breakdown of the hydrocarbon, in order to form additional quantities of hydrocarbon to continually supply a source of single crystal carbon for deposition on the surface of the diamond seed crystal.

It is therefore the principal object of this invention to provide a novel method for producing diamond particles from diamond seed crystals, which process is substantially continuous in that the deposition of amorphous or elemental carbon is avoided thereby eliminating the need to continually clean the seed crystal for the removal of elemental or amorphous carbon deposited thereon.

In connection with the foregoing object, it is another object of this invention to provide a process for the synthesis of diamond particles from diamond seed crystals wherein the growth rate of the diamond seed crystal is greatly improved over other known similar processes.

Still another object of the present invention is to provide a method of the type set forth above, which is operated at elevated temperatures in a manner heretofore unknown in the art.

Yet another object of the present invention is to provide a method for producing diamond particles from diamond seed crystals wherein the process is operated under atmospheric pressure and at a temperature in the range of from about 1,100° C. to about 1,700° C., and in an environment comprising substantially at least 95 percent hydrogen gas and 5 percent or less of a hydrocarbon having about one to five carbon atoms as the source of the carbon, in the presence of a catalyst heater, the catalyst acting to catalyze the reaction between the free hydrogen gas and any amorphous or element carbon which is formed as a result of the breakdown of the hydrocarbon thereby generating additional quantities of hydrocarbon to provide the source for single crystal carbon for deposition upon the surface of the seed crystal.

Another object of the present invention is to provide a method for growing diamond particles from a diamond seed crystal which is a substantially continuous process and which will result in a growth rate on the order of 0.1 to about 0.25 micrometers per face per minute of the seed crystal, thereby greatly increasing the size and weight of the resulting diamond particle which is formed thereby.

Other objects and advantages inherent in this invention will be better understood by reference to the accompanying description and examples wherein the details and preferred embodiments of the present invention are more thoroughly set forth.

DETAILED DESCRIPTION OF INVENTION

Generally, the process of the present invention comprises the steps of providing a diamond seed crystal upon which the synthetic growth is to occur. The diamond seed crystal is placed in a catalyst cone heater, platinum or palladium being the preferred types of catalyst heaters, and an environment is provided surrounding the diamond seed crystal contained within the cone heater, the environment consisting of at least 95 percent of hydrogen gas and 5 percent or less of hydrocarbon having from one to five carbon atoms. Pressure is maintained at atmospheric or is slightly higher than atmospheric pressure, and the cone heater is heated to a temperature of between 1,100° and 1,700° C. in order to initiate and continue the deposition of single crystal carbon upon the surface of the seed crystal. Under these operating conditions, the seed crystal will increase in size at the rate of from approximately 0.1 to 0.25 micrometers per face, per minute and the growth rate will remain continuous throughout the operation of the process, since according to this process, the deposition of elemental or amorphous carbon on the surface of the diamond seed crystal is avoided.

It is, of course, very necessary and important that the seed crystals be perfectly clean before the process is initiated since seed crystal cleanliness is very important to proper epitaxial growth of diamonds. Impurities which are found to exist include iron among other metals and usually these are removed by cleaning the seed crystals in solvents such as trichloroethylene and acid cleaning in such acids as sulphuric acid and nitric acid. Methods for cleaning the diamond seed crystals are disclosed in the art, such as for example, in U.S. Pat. No. 3,030,188. Following cleaning of the diamond seed crystals with acids such as sulphuric and nitric as indicated above, the seed crystals are thoroughly rinsed in high purity water and thoroughly dried. Thereafter, the diamond seed crystal is placed in the cone heater and the reactor, which will be more thoroughly described hereinafter, is then closed and the seed crystal is subjected to an oxidizing atmosphere such as oxygen or dry filtered air at a temperature greater than 400° C. for a period of 10 – 15 minutes. These conditions will gas etch the remaining impurities on the surface of the seed crystal producing extremely clean diamond surfaces for the epitaxial growth process.

The seed crystals which are employed in this process may be of either natural or synthetic diamonds, and generally, commercial 0–1 micron grade diamond, which has an average particle diameter off 0.1 micron has been found to be satisfactory seed crystal for this invention. Larger seed crystals may, of course, be employed although it is clear that a greater weight gain will be realized for smaller seed crystals than will be obtained by using larger seed crystals for the reason that the surface area of smaller crystals is much greater. Obviously, diamond growth is a function of surface area available for deposition of single crystal carbon, and for this reason, smaller seed crystals having a greater surface area will realize a greater gain in weight and size.

As has been indicated hereinabove, the art shows various types of starting materials as the carbon source for a diamond growing process. Hence, carbon monoxide has been indicated to be a source for single crystal carbon, and a process relating to the use of carbon monoxide is disclosed in U.S. Pat. No. 3,030,187. Other materials which have been used to provide the source of carbon include straight chain hydrocarbons, such as methane, ethane, propane, butane and the like, as well as methyl chloride, methyl mercaptan and acetone. However, the processes heretofore described in the art utilizing hydrocarbons have not been able to eliminate the formation of graphite or elemental carbon, as opposed to single crystal carbon, and therefore, all such prior art processes have required the constant cleaning of the seed crystals during the growth process. In accordance with the present invention, it has been found that hydrocarbons having from one to five carbon atoms may be effectively utilized so long as the proper reaction conditions are employed for the growth process. Hence, it is intended to be within the scope of this invention to provide starting materials such as straight chain hydrocarbons, such as methane, ethane, propane, butane and pentane, i.e. those generally having from one to five carbon atoms, and due to the particular reaction conditions employed herein, any elemental or amorphous carbon which is formed is immediately converted back to hydrocarbon thereby providing an additional source for single crystal carbon. Therefore, the method of the present invention uses the mechanism of producing carbon atoms from a hydrocarbon compounds, or carbon bearing compounds, such as the straight chain hydrocarbons having from one to five carbon atoms, in accordance with the following reaction:

$$C_nH_{2n+2} \xrightarrow{heat} C + H_2 \text{ (gas)}$$

The atomic carbon liberated in this reaction when disposed on or near the surface of the seed crystal will orient itself to the exact configuration of the seed and become deposited thereon. Due to the temperature conditions employed as well as the environment surrounding the seed crystal, any elemental or amorphous carbon which is formed and liberated will be immediately reacted to form hydrocarbon in accordance with the following reaction:

$$2H_2 + C \xrightarrow[\text{heat}]{\text{catalyst}} CH_4$$

The reaction conditions under which the process is operated are extremely important to the efficient operation thereof. Hence, such factors as starting materials, temperature, the environment surrounding the diamond seed crystal, and the catalyst heater provided, are all important in order to achieve a continuous diamond growth process which results in an improved growth rate of the seed crystal. First, with regard to temperature, it is first to be noted that all of the prior art teaches the employment of the temperature in the range of 600° and 1,100° C. More specifically, U.S. Pat. No. 3,371,996 describes a diamond growth process utilizing carbon monoxide as the starting material and the disclosure therein clearly indicates that the temperature range must be between 600° C. and about 1,100° C., since if the temperature rises above 1,100° C. graphite becomes deposited upon the diamond surface to the exclusion of diamond carbon and no diamond growth will occur. Similarly U.S. Pat. No. 3,030,188, teaches the operation of a diamond growth process in a temperature range of about 1,000° C., this patent indicating that at 1,200° C. black carbon was deposited with no detected diamond growth. In accordance with the present invention, it has been found to be desirable to use a temperature range of between 1,100° C. and 1,700° C., the preferred range being between 1,500° and 1,700° C. in order to avoid the formation and deposition of elemental carbon, thereby to render the process substantially continuous. Hence, it has been found that at a temperature of below 1,100° C. one is not able to obtain the necessary degree of disassociation of the hydrocarbon in order to liberate carbon. Above the temperature of 1,700° C. the metal of which the catalyst heater is formulated will melt. It has been found that operating within this temperature range, and due to the hydrogen rich environment, which is provided in the area surrounding the diamond seed crystal which will be more fully discussed hereinafter, as any elemental or amorphous carbon, or graphite carbon, is formed during the breakdown of hydrocarbon, such graphite carbon will combine with the hydrogen in the presence of the catalyst, which is also employed as the heater, and at the temperature range as set forth herein, to form a hydrocarbon which thereby prevents such amorphous or graphite carbon from being deposited upon the surface of the seed crystal. For this reason, it is considered to be very important to the operation of the process of the present invention to operate within the temperature range of 1,100° C. to about 1,700° C.

With regard to the pressure conditions, it has been found that in fact, the process of the present invention is actually not pressure dependent, Hence, the process has been successfully operated under vacuum conditions, as well as under pressure conditions higher than one atmosphere, for the sake of convenience and simplicity, however, it has been found that operation of the process at an atmospheric pressure of one atmosphere is preferred.

Another important aspect of the present invention is the provision of a proper environment surrounding the diamond seed crystal during the growth process. To this end, it has been found that an environment consisting of at least 95 percent hydrogen gas and from about 5 percent to a lesser amount of the hydrocarbon employed will result in the proper environment for a good diamond growth to occur. The particular ratio of hydrogen gas to hydrocarbon will depend upon the particular hydrocarbon employed in the reaction. For example, if a hydrocarbon having five carbon atoms, e.g. pentane, is employed, a smaller amount of the hydrocarbon may be used since upon disassociation and breakdown of the hydrocarbon, more carbon is available per molecule of hydrogen utilized. Actually, the process of the present invention has been successfully operated utilizing volumes of hydrocarbon as low as one part per billion. As has been indicated above, it is preferred to use a straight chain hydrocarbon having no more than five carbon atoms, for the reason that such hydrocarbons, upon breakdown, will always produce a methyl radical under the conditions of heat and pressure mentioned herein. Branch chain hydrocarbons, on the other hand, tend to produce other radicals upon breakdown, and hence, are not preferred. In addition, the problem which occurs when hydrocarbons having more than five carbon atoms are employed is that the hydrocarbon, which is in the gas form, will have a tendency to liquefy, and therefore, it becomes necessary to reduce the pressure to prevent such liquefication. For this reason, the preferred embodiment of the present invention contemplates the use of straight chain hydrocarbons having from one to five carbon atoms.

Another important component of the environment supplied in the area surrounding the diamond seed crystal is hydrogen gas. The purpose of the hydrogen gas is to react with any elemental or amorphous carbon or graphite carbon which is formed as a result of a breakdown of the hydrocarbon employed, to form additional quantities of hydrocarbon. Hence, the hydrogen gas, in the presence of the catalyst heater, and under temperature conditions of between 1,100° and 1,700° C. will ionize forming hydrogen ions which will readily react with the elemental carbon or graphite carbon, as the same are formed, since this form of carbon is less stable than the single crystal carbon or diamond carbon which is to be deposited on the surface of the seed crystal. The reaction product of this reaction is additional amounts of hydrocarbon, in accordance with the following reaction:

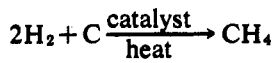

$$2H_2 + C \xrightarrow[\text{heat}]{\text{catalyst}} CH_4$$

Furthermore, by literally flooding the environment with hydrogen gas, the above reaction is assured to occur and in this manner the amorphous carbon or graphite carbon is not permitted to become deposited on the surface of the seed crystal. It will be appreciated, therefore, that at no time during the growth process it is necessary to discontinue the reaction for the purpose of removing the seed crystal to clean the same or to remove this unstable form of carbon from the surface of the seed crystal. It is known that once amorphous carbon or elemental or graphite carbon becomes deposited upon the surface of the seed crystal, the new growth becomes black due to the presence of this form of carbon, and the structure of the diamond growth is degraded to the point where graphite and amorphous carbon will be deposited on the seed crystal and the diamond growth would cease to occur because of the lesser energy requirements of the carbon to deposit as graphite and amorphous carbon as opposed to single crystal carbon or diamond carbon. It will therefore be appreciated that the presence of the hydrogen environment in combination with the catalyst heater which functions to catalyze this reaction are extremely important factors in the process of the present invention.

With regard to the catalyst heater employed, and as has been indicated hereinabove, the function of the catalyst in the present process is not for the purpose of catalyzing the disassociation or breakdown of the hydrocarbon during the growth process in the manner disclosed by other prior art references. In fact, the principal function of the catalyst in this process is for the purpose of catalyzing the reaction between the hydrogen gas and the amorphous carbon or graphite carbon which is formed during the breakdown of the hydrocarbon in order to produce additional quantities of hydrocarbon. It is in this manner that the equipment, as well as the seed crystal are kept free and clear of the deposition of elemental carbon, thereby enabling the process to be made continuous until the desired diamond growth is achieved. The preferred catalyst materials utilized in this process are platinum and palladium, and in fact, it has been found desirable to form the heater from either palladium or platinum wire. In this manner, the platinum or palladium wire is used not only as a catalyst, but also as a resistance heater. Since diamond is not heated well by radiant heat, because of its transparency, the platinum or paladium wire is wound in the form of a cone and the seed crystal may be then be appropriately placed in the cone and due to the fact that the hydrogen gas surrounds the diamond seed crystal, it is heated by the resistance heater, which in turn, heats the crystal. Of course, other heating sources may be utilized, such as R.F. heating, furnace heating, and the like, and this may be done so long as the platinum is available to perform its function as an unorthodox catalyst to catalyze the reaction between the hydrogen and the elemental carbon or graphite carbon. While platinum and palladium are the preferred catalyst materials, it has been found that nickel or silver catalysts can be utilized although these materials perform with less efficiency. Hence, the preferred materials are platinum and palladium. If desired, composite heaters may be utilized, that is, heaters formed of a metallic substance which are plated with platinum or palladium, and then formed into a cone assembly in order to receive therein the seed crystal.

The only requirement necessary for the materials and other equipment employed in the operation of the process of the present invention is that the materials or equipment either be able to withstand heat in the temperature range of from 1,100° to 1,700° C. or that such materials and components be shielded from the heat. Commercial horizontal or vertical reactors have been employed with good results and generally, such equipment merely consists of a platform having positive and negative lead terminals disposed thereon to which the ends of the catalyst heater are connected. The environment surrounding the catalyst heater and the leads is appropriately enveloped by any suitable means such as a bell jar or the like which is provided with gas inlets and a gas outlet to permit the hydrocarbon gas and hydrogen gas to enter the reaction environment and to permit expended gases to be exhausted therefrom.

To illustrate one embodiment of the present invention, a diamond seed crystal in the form of a cube was utilized, the cube measuring one micrometer a side. The reaction conditions employed were as follows:

a. the gaseous atmosphere included 95 percent hydrogen gas and 5 percent methane gas, based upon volume;

b. the temperature was maintained at approximately 1,500° C; as an c. a platinum catalyst heater was employed wound in the form of a cone for holding the diamond seed crystal therein;

d. the pressure in the reaction chamber was maintained at atmospheric pressure.

After the power source was turned on, the reaction commenced and at the end of a minute reaction time, each face of the cube measured 1.2 micrometers on a side representing a growth rate calculated to be about 0.1 micrometer per face per minute based upon growth time of 20 minutes. The original volume of the cube was one cubic micrometer, and after one minute of reaction time, the volume of the cube was determined to be 1.728 cubic micrometers, or a volume metric increase of 72.8 percent.

It has now been determined that using the conditions as employed above, a diamond seed crystal will increase in size at the rate of between 0.1 to 0.25 micrometers per face, per minute. In comparing the rate of growth obtainable by virtue of the present process as compared to the processes described in the prior art, it has been determined mathematically that the rate of growth of the present invention is on the order of anywhere between 50 and 400 percent greater than the rate of growth obtainable by virtue of any of the processes of the prior art.

In accordance with the above description, it is clear that there has been provided by virtue of the process of the present invention, a process for growing diamonds synthetically, which process is virtually continuous in that it eliminates the undesirable deposition of amorphous carbon or graphite carbon on the surface of the seed crystal. In addition, the growth rate obtainable by virtue of the process of the present invention, which growth rate is due to the novel reaction conditions employed herein, is much greater than the growth rate obtainable by any of the prior art processes presently existing. It will therefore be appreciated that all of the above objects and advantages have been achieved by virtue of the process as described herein resulting in a novel and economically feasible process for synthetically growing diamonds by using a diamond seed crystal.

While there has been described what is at present considered to be the preferred embodiments of the present invention, it is to be understood that various modifications may be made therein and it is intended to cover in the appended claims all such modifications as fall within the true spirit and scope of the invention.

What is claimed is:

1. A continuous process for growing diamond on a diamond seed crystal comprising the steps of providing a diamond seed crystal, contacting said diamond seed crystal with a hydrocarbon having from one to about five carbon atoms in an environment consisting of at least 95 percent hydrogen gas by volume and about no more than 5 percent of the said hydrocarbon by volume, maintaining the temperature of the reaction environment in the range of from about 1,100° to about 1,700° C., and reacting the said diamond seed crystal with the said hydrocarbon and the hydrogen gas in the presence of a catalyst being a member selected from the group consisting of platinum and paladium, thereby causing said hydrocarbon to form diamond carbon and deposit it on the surface of said diamond seed crystal while simultaneously causing less stable forms of carbon also formed from said hydrocarbon to react with the hydrogen gas in the presence of the catalyst and the temperature conditions to form additional quantities of hydrocarbon, said process continuing until the desired diamond growth has been achieved.

2. The process as set forth in claim 1 above, wherein said hydrocarbons comprise straight chain hydrocarbons having from one to five carbon atoms.

3. The process as set forth in claim 1 above, wherein said catalyst comprises platinum.

4. The process as set forth in claim 3 above, wherein said platinum catalyst is formed from platinum wire the ends of which form contact leads for connection to a power source thereby to function as a platinum catalyst heater.

5. The process as set forth in claim 1 above, wherein the gaseous environment comprises 95 percent hydrogen gas and 5% of a straight chained hydrocarbon having from one to five carbon atoms.

6. The process as set forth in claim 5 above, wherein said hydrocarbon comprises a methane.

* * * * *